April 3, 1928. 1,665,092
J. L. GREENWOOD
WHEEL RIM
Original Filed Sept. 8. 1924
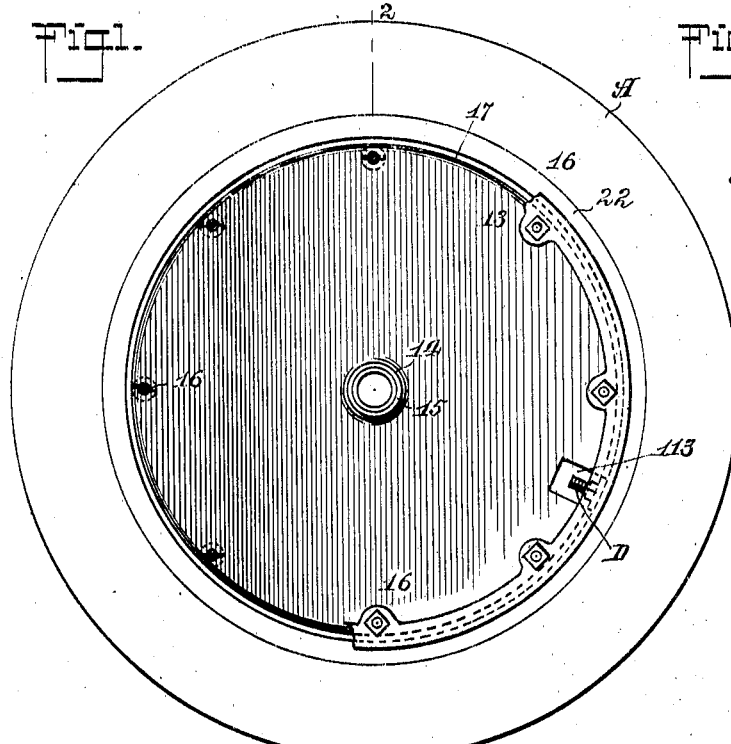
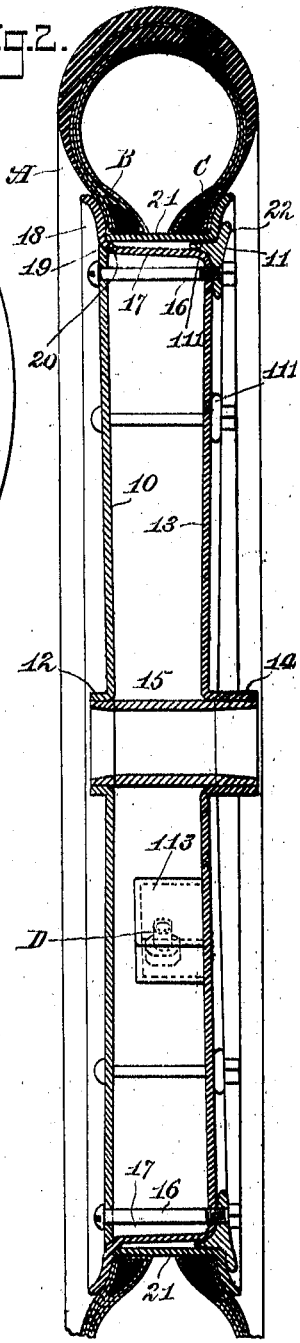
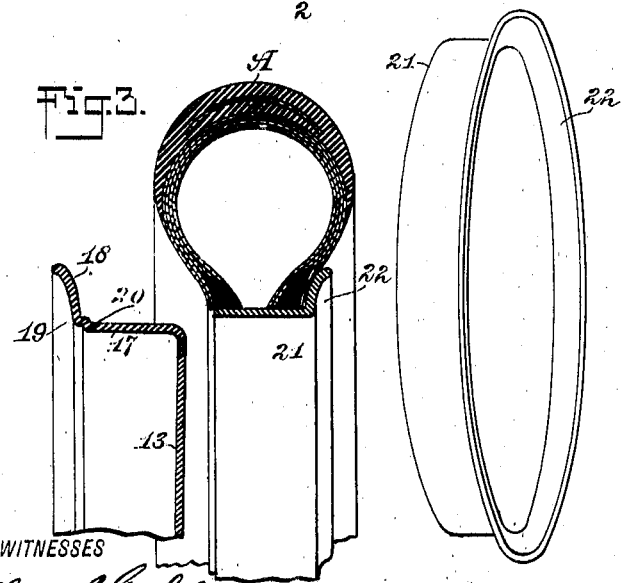
WITNESSES
INVENTOR
J. L. Greenwood
BY
ATTORNEYS Patented Apr. 3, 1928.

1,665,092

UNITED STATES PATENT OFFICE.

JASPER LEOPOLD GREENWOOD, OF NORTH EAST HARBOR, NOVA SCOTIA, CANADA.

WHEEL RIM.

Application filed September 8, 1924, Serial No. 736,555. Renewed January 10, 1928.

My invention relates to a sectional rim and particularly to a rim, the elements of which are non-split or of unbroken continuity.

The general object of my invention is to provide a sectional rim of simple elements adapted to be assembled on a wheel or demounted with facility and which when assembled will possess adequate strength and rigidity.

The nature of my invention and its distinguishing features and advantages will clearly appear as the description proceeds.

Reference is to be had to the accompanying drawings forming a part of this specification, it being understood that the drawings are merely illustrative of examples of the invention.

Figure 1 is a view of a disk wheel embodying my invention showing the outer face of the wheel in elevation, parts being broken away and others in section;

Figure 2 is an enlarged transverse vertical section in a plane indicated by the line 2—2, Figure 1, with the parts assembled and showing a tire casing mounted thereon;

Figure 3 is a fragmentary transverse vertical section illustrating the rim parts disassembled;

Figure 4 is a perspective view of the outer rim element.

Referring at first more particularly to the form of the invention shown in Figure 1, the numeral 10 indicates the inner disk or that disk at the inner side of the wheel; 11, a wedge ring at the outer side of the wheel, the disk 10, having a hub 12 stamped integrally with said disk 10. A disk 13 is provided within the outer ring 11 and adjacent thereto and is formed with an integral hub member 14. A hub sleeve 15 fits within and is welded or otherwise made solid with the hubs 12 and 14. Screws or bolts 16 are passed through the disks 10 and 13 and through ring 11 to bind the whole firmly together.

The sectional rim comprises an inner rim element 17 which in the form of the invention shown in Figures 1 to 4 is stamped integral with the disk 13. Said rim element 17 which is of unbroken annular continuity is formed with an annular flange or bead 18 adapted to lie at the outer side of the outer flange B of tire casing A. Against the reentrant angle 19 formed by the rim element 17 and flange 18 the peripheral edge of the disk 10 bears. The flange 18 is at the opposite side of the wheel from the disk 13 so that the inner rim element 17 extends transversely from one side of the wheel to the other.

At the juncture of the flange 18 with rim 17, at the outer surface, an annular bead 20 is produced on which is adapted to bear one edge of the outer rim element 21. Said outer rim element 21 is provided at the outer side of the wheel with a bead or flange 22 to bear against the adjacent flange C of the tire casing A. Thus, the rim element 21 has its tire retaining flange 22 at the outer side of the wheel and at the opposite side of the wheel presents an edge portion to rest on the bead 20 of the inner rim 17. The outer periphery of the wedge ring 11 of the wheel is beveled to conform to the curved outer surface of the flange 22.

The tightening up of the screws or bolts 16 causes the periphery of inner wheel disk 10 to bear against the angle 19 and exerts a pressure radially outward and laterally inward against the inner rim element 17. At the same time the wedge ring 11 exerts a pressure in a direction laterally inwardly against the flange 22 of the outer rim element 21 forcing the inner edge portion of said element 21 at the inner side of the wheel against the outer bead or rim 18.

The pressure on the wedge ring 11 forces its lugs 111 between the rim 17 and the rim 21 and said lugs together with the annular protuberance 20 serve to space said rims 17 and 21 from each other.

In the disk 13 is an inward depression 113 (Figures 1 and 2) affording clearance for and making accessible the tire valve D.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. In a wheel structure, a wheel disk formed with a laterally extending peripheral flange, said flange terminating in a radially projecting tire retaining flange, a tire rim section adapted to loosely fit about the laterally extending flange, said tire rim section being formed with a tire retaining flange complemental to the first named tire retaining flange, wedge lugs extending between the tire rim section and lateral flange, a second wheel disk having its periphery fitted within the outer edge of the lateral flange, and a plurality of securing bolts each of which serves to hold a wedge lug in position and secure together the two wheel disks, whereby a composite and rigid wheel structure is provided.

2. In a wheel structure, a wheel disk terminating in a laterally extending peripheral flange slightly diverging toward its free end, a radially projecting tire retaining flange joined to said peripheral flange at its free end, the junction of said flanges defining a reentrant angle, a second wheel disk fitted in said re-entrant angle and bolts extending between the wheel disks.

3. A wheel structure as defined in claim 2, the second wheel disk having an inwardly beveled peripheral edge fitted within the said angle.

JASPER LEOPOLD GREENWOOD.